United States Patent
Boyer et al.

(10) Patent No.: US 6,382,193 B1
(45) Date of Patent: May 7, 2002

(54) METHOD OF SUPERCHARGING AN ENGINE

(75) Inventors: Bradley Alan Boyer, Canton; William Francis Stockhausen, Northville, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/716,649

(22) Filed: Nov. 20, 2000

(51) Int. Cl.⁷ .............................................. F02B 33/00
(52) U.S. Cl. ............... 123/560; 123/198 F; 123/DIG. 7
(58) Field of Search ........................ 123/559.1, 560, 123/DIG. 7, 198 F, 179.14, 179.18, 323, 184.53; 60/39.183

(56) References Cited

U.S. PATENT DOCUMENTS

| | | | |
|---|---|---|---|
| 3,744,934 A | 7/1973 | Ueno | 123/DIG. 7 |
| 4,191,152 A | 3/1980 | Deutschmann | 123/560 |
| 4,248,198 A | 2/1981 | Deutschmann et al. | 123/560 |
| 4,538,584 A * | 9/1985 | Schier et al. | 123/560 |
| 4,572,148 A | 2/1986 | Deutschmann et al. | 123/560 |
| 4,671,226 A | 6/1987 | van Rinsum | 123/560 |
| 4,860,716 A | 8/1989 | Deutschmann | 123/560 |

FOREIGN PATENT DOCUMENTS

| JP | 356110517 A | * 9/1981 | .............. 123/560 |
|---|---|---|---|

* cited by examiner

Primary Examiner—Thomas Denion
Assistant Examiner—Thai-Ba Trieu
(74) Attorney, Agent, or Firm—Carlos Hanze

(57) ABSTRACT

A variable displacement internal combustion engine having an intake manifold for providing ambient air and a boost manifold is provided. Either designated cylinders or selected cylinders may be operated in a non-firing mode wherein air may be compressed in a non-firing cylinder and ported to the boost manifold to provide boosted air pressure to firing cylinders. Each cylinder has an intake valve, an intake/compressed air valve, and an exhaust valve. The intake valves are controlled by electromagnetic actuators. The exhaust valve may be controlled by an electromagnetic valve actuator or a conventional valve actuator, if desired. Intake/compressed air valves of cylinders operating in the non-firing, compressor mode are ported to the boost manifold and selectively timed to provide compressed air to the boosted manifold when additional torque is desired provided that some of the cylinders are operating in the compressor mode.

6 Claims, 2 Drawing Sheets

| OPERATING MODE | # OF FIRING CYLINDERS | # OF INACTIVE CYLINDERS | BOOST | INTERMEDIATE VALVE |
|---|---|---|---|---|
| FULL CYLINDER | 8 | 0 | NATURALLY ASPIRATED | OPEN |
| BOOSTED VDE | 4 | 1-4 FOR VARIABLE BOOSTING | VARIABLE | CLOSED |
| VDE | 4 | 4 | NATURALLY ASPIRATED | OPEN OR CLOSED |

| OPERATING MODE | # OF FIRING CYLINDERS | # OF INACTIVE CYLINDERS | BOOST | INTERMEDIATE VALVE |
|---|---|---|---|---|
| FULL CYLINDER | 8 | 0 | NATURALLY ASPIRATED | OPEN |
| BOOSTED VDE | 4 | 1-4 FOR VARIABLE BOOSTING | VARIABLE | CLOSED |
| VDE | 4 | 4 | NATURALLY ASPIRATED | OPEN OR CLOSED |

METHOD OF SUPERCHARGING AN ENGINE

BACKGROUND OF THE INVENTION

1. Field of the Invention

The present invention relates to a method of boosting the net engine torque of a variable displacement engine running in a variable displacement mode by using non-firing cylinders to boost manifold pressure.

2. Background Art

Vehicle engines including internal combustion engines and diesel engines are currently designed to maximize power while maximizing fuel efficiency and minimizing emissions.

"Camless" engines (engines that do not have a conventional camshaft for actuating intake and exhaust valves) have been developed that, for example, would enable a four-stroke internal combustion engine to operate without a throttle to optimize engine operation. Camless engines may use hydraulic valve lifters or electromechanical valve lifters for actuating intake and exhaust valves.

A variable displacement engine (VDE) provided with camless valves permits one or more cylinders to be disabled under certain conditions to improve fuel economy. For example, a V8 camless VDE can be operated as a V4 during constant speed driving when the power requirement is low. When power requirements increase, the engine may be operated in a full cylinder mode with all cylinders firing.

One limitation of VDE engines is that when there is a large power demand, it is necessitated that it be shifted from the variable displacement mode to the full cylinder mode.

Another problem related to VDE engines is that the net engine torque available in the VDE mode limits the portion of the customer or regulatory driving cycle in which it may be utilized.

One attempt to address the above problems is disclosed in U.S. Pat. No. 4,671,226 to van Rinsum that discloses a supercharged multi-cylinder, four-cycle diesel engine which under partial loads has some cylinders operate as the engine while other cylinders operate as a compressor supplying compressed air to the firing cylinders. According to this patent, at least one additional valve must be provided for each cylinder head of the cylinders that are to be operated as a compressor. The additional valve is independent of the intake and exhaust valves. The additional valve controls an additional gas conduction channel that is connected to the intake or exhaust gas flow of the cylinders operating as a compressor. The extra valves and additional gas conduction channel are additional components that add weight and, therefore, may reduce fuel efficiency. This patent also fails to disclose any method of reducing unwanted detonations as temperatures in the firing cylinders increase.

These and other problems and disadvantages associated with prior art camless engines and variable displacement engines are addressed by Applicants' invention as summarized below.

SUMMARY OF THE INVENTION

According to the present invention, a variable displacement internal combustion engine is disclosed that has a plurality of internal combustion cylinders that are operable in a firing mode or in a compressor mode. The engine has an intake manifold that provides air to a first set of intake valves provided for each of the cylinders. A boost manifold receives compressed air from non-firing cylinders operating in the compressor mode and provides compressed air to cylinders operating in the firing mode. Each cylinder has an intake valve controlled by an electromagnetic actuator, an intake/compressed air valve controlled by a second electromagnetic actuator, and an exhaust valve controlled by another valve actuator. The intake/compressed air valves of cylinders operating in the compressor mode are timed to selectively provide compressed air to the boosted manifold when vehicle operation requires additional torque.

According to one embodiment of the invention, a subset of cylinders are ported to the boost manifold and may be selectively operable in the compressor mode. Alternatively, all of the cylinders of the engine may be selectively operable in the compressor mode wherein all of the cylinders would be ported to the boost manifold.

According to another aspect of the invention, the engine may be a four-cycle engine having an intake stroke, a compression stroke, a combustion stroke, and an exhaust stroke. The four-cycle engine may be operated in a full cylinder mode wherein the intake valves and intake/compressed air valves open during the intake stroke and the exhaust valve opens during the exhaust stroke.

A further aspect of the invention is that it is a four-cycle engine (as described above) that may be operated in a variable displacement mode. In the variable displacement mode, the intake valves open during the intake stroke and the combustion stroke, the intake/compressed air valves open during the compression stroke, and the exhaust valve opens during the exhaust stroke.

According to yet another aspect of the invention, the four-cycle engine (as described above) may be operated in a boosted variable displacement mode wherein the intake valves and intake/compressed air valves open during the intake stroke, the intake valves close during the compression stroke, while the intake/compressed air valves of non-firing cylinders open during the compression stroke and the exhaust valve opens during the exhaust stroke.

According to another aspect of the invention, exhaust gas from the firing cylinders may be introduced into the non-firing boosting cylinders by opening of the normally deactivated exhaust valves during a portion of the downward stroke. This recirculated exhaust gas is then delivered to the boosted manifold in order to reduce emissions.

It is an objective of the invention to use the non-firing cylinders of a variable displacement engine equipped with hydraulic or electromechanical valves to supercharge or boost the manifold pressure of the active firing cylinders and thereby increase the power output of the engine. The performance and efficiency of the firing cylinders and the non-firing cylinders that act as a two-stroke reciprocating compressor may be improved by utilizing adjustable valve timing. It is expected that a 30%–40% increase in torque may be achieved by the invention as compared to naturally aspirated variable displacement engines.

Another object of the invention is to reduce detonation, or spark knocks, by periodically using each of the cylinders when operated in the VDE mode as a compressor to reduce temperatures within the firing cylinders.

Another object of the invention is to improve fuel evaporation during startup and reduce feed gas hydrocarbon emissions by preheating the intake air of the firing cylinders by compressing it in the non-firing cylinders.

Yet another object of the invention is to extend the operating range for the engine operating in the VDE mode. Engine performance is also improved by eliminating the sudden surge in power when additional engine cylinders are activated. Fuel economy is improved and emissions reduced by operating fewer firing cylinders in the VDE mode with boosted manifold absolute pressure (MAP) instead of operating all cylinders with a reduced MAP.

Another object of the invention is to provide more stable combustion as a result of the higher manifold pressure in the boosted cylinders that facilitates exhaust gas recirculation and reduces feed gas NOx emissions.

Yet another object of the invention is to permit the output of boosted cylinders to vary in accordance with torque requirements and dependent upon intake/compressed air valve timing. The timing of intake/compressed air valves is optimized to efficiently deliver boosted charge with minimum parasitic losses.

It is yet another object of the invention to permit sequential intake valve timing of the intake valves relative to the intake/compressed air valves in each cylinder to promote the swirl of intake gases in the cylinder.

These and other objects and advantages of the invention will be readily apparent to one of ordinary skill in the art to which the invention relates.

DETAILED DESCRIPTION OF THE PREFERRED EMBODIMENT(S)

Figure 1:
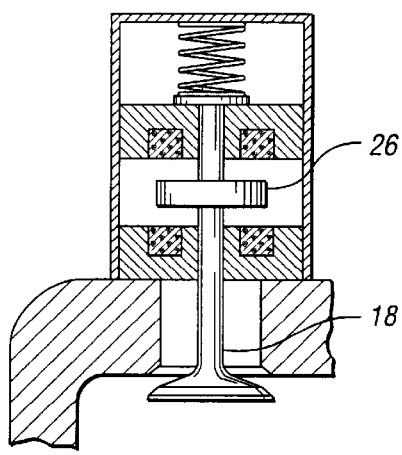
FIG. 1 is a schematic representation of a variable displacement internal combustion engine having an intake manifold and a boost manifold made in accordance with one embodiment of the present invention.

Referring now to FIG. 1, a V4/V8 variable displacement engine (VDE) 10 is schematically illustrated. The engine 10 includes eight cylinders 12. The cylinders $12^1$ and $12^8$ have each been further identified with a superscript corresponding to cylinders 1 through 8. An intake manifold 14 provides naturally aspirated air intake into an intake valve 18 of each of the cylinders. Boost manifold 16 connects one intake compressed air valve 20 of each non-firing cylinder to the boost manifold. Two intake valves are required for each cylinder and may be either two intake valves 18 or one intake valve 18 and one intake/compressed air valve 20. One intake valve of each non-firing cylinder is connected to the boost manifold while a second intake valve is connected to the main intake manifold. The non-firing cylinders, $12^2$, $12^3$, $12^5$, and $12^8$ can be utilized as two-stroke reciprocating compressors to feed boosted manifold pressure to the firing cylinders $12^1$, $12^4$, $12^6$, and $12^7$.

Timing of the two intake valves in the non-firing cylinders can be controlled to, in turn, control the operating pressure. The operating pressure can be controlled to supply the optimum amount of boost to the firing cylinders to maximize fuel economy and performance. Intake/compressed air valves 20 may function as an exhaust valve during the boosted VDE operation to control the flow of boosted air charge into the boosted manifold 16.

A controlled quantity of exhaust gas recirculation (EGR) can be pumped by pulling exhaust in from the exhaust valves of the non-firing cylinders that is then fed into the firing cylinders. Obtaining significant amounts of EGR is difficult with conventional methods at high MAP levels.

Many different valve timing strategies for the intake valves of both the firing and non-firing cylinders can be optimized depending upon engine operating conditions. Valve timing could be adjusted to minimize the pumping losses of the non-firing cylinders, while supplying the required boost to the firing cylinders. To minimize pumping losses, it is possible to use only a portion of the non-firing cylinders to pressurize the boosted intake manifold for a given set of operating conditions.

The intermediate throttle 24 connects intake and boost manifolds 14,16. The intermediate throttle 24 remains closed while in the boosted VDE mode and is open in the full cylinder mode and non-boosted VDE mode. The non-firing cylinders provide a boosted intake charge once every crank revolution (360°0). The non-firing cylinders can provide boost for firing cylinders which have a conventional intake event once every two crank revolutions (720°). Additionally, an inter-cooler could be fitted onto the outlet of the non-firing intake valves 20 to provide charge cooling to reduce engine NOx emissions and knock tendencies.

The firing cylinders could be operated on the Miller Cycle wherein the intake valve closing is timed sequentially to promote swirl within the cylinders.

The present invention could be used with diesel engines or other VDE configurations such as I2/4, I3/6, V3/6, V5/10.

Figure 2:
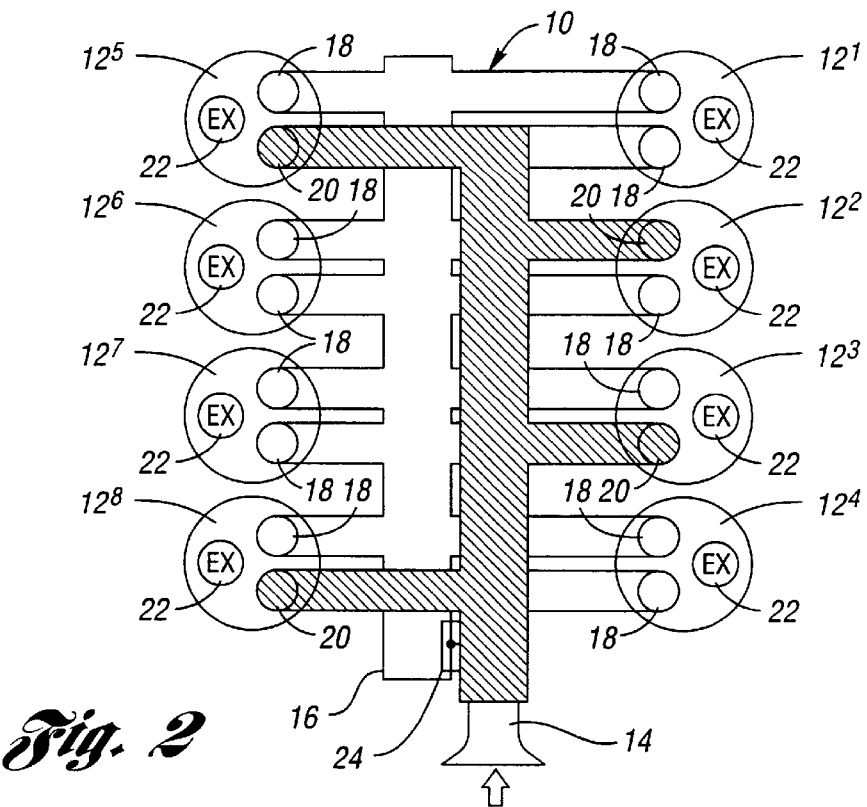
FIG. 2 is a fragmentary schematic view of an electromechanical valve actuator and valve for a cylinder.

Referring to FIG. 2, a valve that could be either intake valve 18, intake/compressed air valve 20 or exhaust valve 22 is shown to include an electromechanical valve actuator 26 that is controlled by an engine control module to open and close the valve in accordance with a control strategy. The electromechanical valve actuator 26 operates in accordance with the description of an electromechanical valve as shown and described in U.S. Pat. No. 6,009,841 disclosure of which is hereby incorporated by reference.

Figure 3:
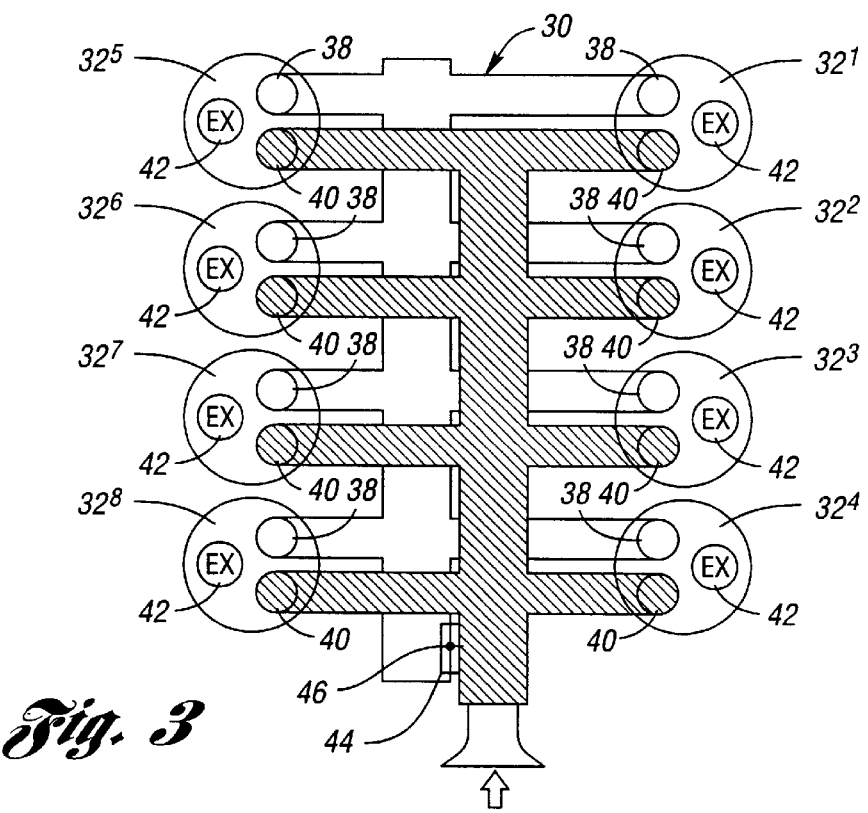
FIG. 3 is a schematic representation of a variable displacement internal combustion engine having an intake manifold and a boost manifold made in accordance with a skip firing embodiment of the present invention.

Referring now to FIG. 3, a skip firing variable displacement engine (VDE) 30 is schematically illustrated. Cylinders $32^1$–$32^8$ are each skip firing cylinders that may be either firing or non-firing depending upon the engine control strategy employed. An intake manifold 34 and boosted manifold 36 are connected to intake valves 38 and intake/compressed air valves 40, respectively. An exhaust valve 42 in each of the cylinders $32^1$–$32^8$ is ported to an exhaust system. Intermediate throttle 44 may be opened to connect the intake manifold 34 and the boosted manifold 36. The intermediate throttle 44 remains closed while in the boosted VDE mode and is open in the regular full cylinder mode and in the boosted VDE mode.

The skip firing VDE engine 30 permits any cylinder to be either active, inactive, or in supercharging operation depending upon the engine control strategy. For each firing cylinder, one intake/compressed air valve 40 provides boosted air while the other intake valve 38 provides naturally aspirated air.

The timing of the two intake valves may be sequentially set so that the first intake valve that has an early valve closing time supplies air at one bar MAP while the intake/compressed air valve 40 supplies air at boosted MAP and has valve opening and closing times that are later than the intake valve 38.

Spark knock, or unwanted detonations, limit the maximum torque available in the VDE mode. Spark retard and/or mixture enrichment may be used to reduce knocking. Knocking may be reduced by using the skip firing VDE 30 to periodically cause each cylinder to become a non-firing cylinder. When the cylinder operates in a non-firing mode, the temperature will decrease within the cylinder as it is used in the compressor mode. The cylinders may also be operated on the Miller Cycle to reduce engine knock. The Miller Cycle combines delayed intake valve closing with boosted manifold pressure.

It is believed that the present invention may be used with cold start strategy for reduction of emissions by preheating the intake air of the firing cylinders by compressing it in the non-firing cylinders. It is believed that this approach may improve fuel evaporation during startup and may also reduce feed gas hydrocarbon emissions.

Figure 4:
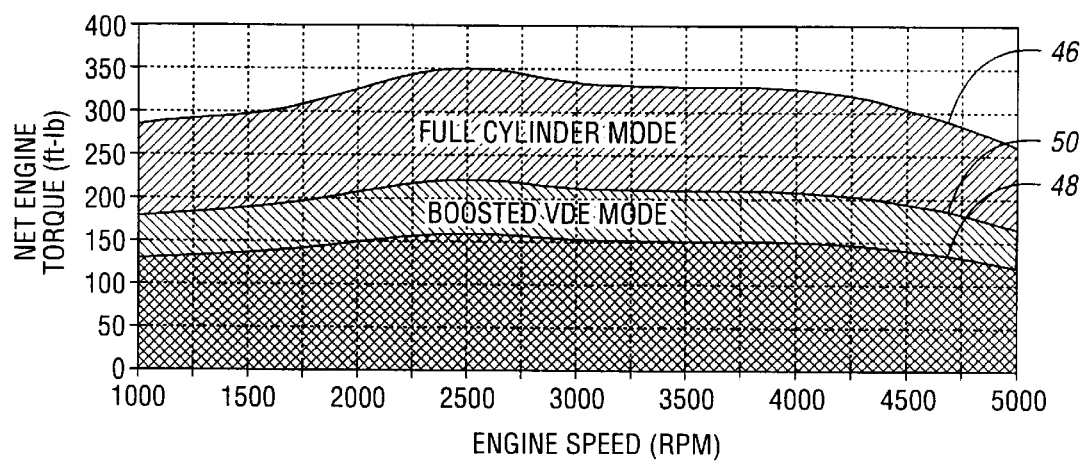
FIG. 4 is a chart illustrating the net engine torque increase made possible with the boosted variable displacement engine of the present invention.

Referring now to FIG. 4, a chart showing torque profiles of the different engine operating modes is provided. A torque profile in the full cylinder mode is identified by reference numeral 46. A torque profile of the engine operating in the VDE mode is designated by reference numeral 48. A torque profile of the boosted VDE mode is indicated by reference numeral 50. According to the invention, the operating range for operating the engine in the VDE mode can be increased from the torque curve 48 to the levels represented by torque curve 50. Fuel economy and emission benefits may result by operating fewer firing cylinders with boosted manifold absolute pressure (MAP) instead of all cylinders with reduced MAP. Due to the higher effective MAP of the boosted cylinders, combustion should be more stable. The higher IMEP of the boosted cylinders also increases the tolerance for exhaust gas recirculation (EGR) that is critical to reducing feed gas NOx emissions.

While the best mode for carrying out the invention has been described in detail, those persons familiar with the art to which this invention relates will recognize various alternative designs and embodiments for practicing the invention as defined by the following claims.

What is claimed:

1. A variable displacement internal combustion engine having a plurality of internal combustion cylinders that have a firing mode and a compressor mode comprising:

an intake manifold for providing air to a first set of intake valves with one valve being provided for each of the cylinders;

a boost manifold for receiving compressed air from cylinders operating in the compressor mode and providing compressed air to cylinders operating in the firing mode;

each cylinder has an intake valve controlled by a first electromagnetic actuator, an intake/compressed air valve controlled by a second electromagnetic actuator, and at least one exhaust valve controlled by a third valve actuator; and wherein the intake/compressed air valves of cylinders operating in the compressor mode are ported to the boost manifold and are selectively timed to provide compressed air to the boosted manifold when additional torque is desired when operating some of the cylinders in the compressor mode, the engine being a four-cycle engine having an intake stroke, a compression stroke, a combustion stroke and an exhaust stroke that is operated in a full cylinder mode wherein the intake valves and intake/compressed air valves open during the intake stroke and the exhaust valve opens during the exhaust stroke.

2. The engine of claim 1 wherein a subset of the cylinders is selectively operable in the compressor mode and are selectively ported to the boost manifold by the intake/compressed air valve.

3. The engine of claim 1 wherein all of the cylinders are selectively operable in the compressor mode and all of the cylinders are selectively ported to the boost manifold by the intake/compressed air valve.

4. A variable displacement internal combustion engine having a plurality of internal combustion cylinders that have a firing mode and a compressor mode comprising:

an intake manifold for providing air to a first set of intake valves with one valve being provided for each of the cylinders;

a boost manifold for receiving compressed air from cylinders operating in the compressor mode and providing compressed air to cylinders operating in the firing mode;

each cylinder has an intake valve controlled by a first electromagnetic actuator, an intake/compressed air valve controlled by a second electromagnetic actuator, and at least one exhaust valve controlled by a third valve actuator; and wherein the intake/compressed air valves of cylinders operating in the compressor mode are ported to the boost manifold and are selectively timed to provide compressed air to the boosted manifold when additional torque is desired when operating some of the cylinders in the compressor mode, the engine being a four-cycle engine having an intake stroke, a compression stroke, a combustion stroke and an exhaust stroke that is operated in a variable displacement mode wherein the intake valves open during the intake stroke and the combustion stroke, the intake/compressed air valves open during the compression stroke and the exhaust valve opens during the exhaust stroke.

5. A variable displacement internal combustion engine having a plurality of internal combustion cylinders that have a firing mode and a compressor mode comprising:

an intake manifold for providing air to a first set of intake valves with one valve being provided for each of the cylinders;

a boost manifold for receiving compressed air from cylinders operating in the compressor mode and providing compressed air to cylinders operating in the firing mode;

each cylinder has an intake valve controlled by a first electromagnetic actuator, an intake/compressed air valve controlled by a second electromagnetic actuator, and at least one exhaust valve controlled by a third valve actuator; and wherein the intake/compressed air valves of cylinders operating in the compressor mode are ported to the boost manifold and are selectively timed to provide compressed air to the boosted manifold when additional torque is desired when operating some of the cylinders in the compressor mode, the engine being a four-cycle engine having an intake stroke, a compression stroke, a combustion stroke and an exhaust stroke that is operated in a boosted variable displacement mode wherein the intake valves and intake/compressed air valves open during the intake stroke, the intake valves close during the compression stroke while the intake/compressed air valves are open during the compression stroke and the exhaust valve opens during the exhaust stroke.

6. The engine of claim 5 wherein cylinders operating in the compressor mode draw exhaust gases through the exhaust valves in addition to drawing air through the intake valves during a portion of a downward stroke, wherein the exhaust gases are compressed with the air in the cylinders operating in the compressor mode and recirculated through the boost manifold to reduce emissions of the cylinders operating in the firing mode.

* * * * *